US012750204B2

(12) United States Patent
Drucker et al.

(10) Patent No.: US 12,750,204 B2
(45) Date of Patent: Sep. 29, 2026

(54) MACHINE LEARNING NETWORK EXTENSION BASED ON HOMOMORPHIC ENCRYPTION PACKINGS

(71) Applicant: International Business Machines Corporation, Armonk, NY (US)

(72) Inventors: Nir Drucker, Zichron Yaakov (IL); Moran Baruch, Petah Tikva (IL)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 17/838,901

(22) Filed: Jun. 13, 2022

(65) Prior Publication Data

US 2023/0403131 A1 Dec. 14, 2023

(51) Int. Cl.
*H04L 9/00* (2022.01)
*G06N 3/08* (2023.01)

(52) U.S. Cl.
CPC ............... *H04L 9/008* (2013.01); *G06N 3/08* (2013.01)

(58) Field of Classification Search
CPC ........ H04L 9/008; G06N 3/08; G06N 3/0464; G06N 3/082
See application file for complete search history.

(56) References Cited

U.S. PATENT DOCUMENTS 10,075,289 B2 9/2018 Laine et al.
2018/0082181 A1 3/2018 Brothers et al.
2021/0397988 A1 12/2021 Sarpatwar et al.
2021/0409191 A1 12/2021 Williams et al.
2022/0058472 A1 * 2/2022 Minixhofer ............ G06N 3/065
2022/0329407 A1 * 10/2022 Soceanu ................. H04L 9/008

OTHER PUBLICATIONS

Chen, Jason. "Faster Neural Networks on Encrypted Data with Intel HE Transformer and Tensorflow." 2020. Medium. 1-16. (Year: 2020).*

K. Nandakumar, N. Ratha, S. Pankanti and S. Halevi, "Towards Deep Neural Network Training on Encrypted Data," 2019 IEEE/CVF Conference on Computer Vision and Pattern Recognition Workshops (CVPRW), Long Beach, CA, USA, 2019, pp. 40-48 (Year: 2019).*

Aharoni et al. "Tile Tensors: A versatile data structure with descriptive shapes for homomorphic encryption", 2020, arXiv, p. 1-17 ( Year: 2020).*

Aharoni et al., "Tile Tensors: A versatile data structure with descriptive shapes for homomorphic encryption", ResearchGate, Nov. 3, 2020, 18 pages.

Anonymous, "Systematic Method of Filter Pruning in a Deep Neural Network", An IP.com Prior Art Database, Apr. 1, 2020, 3 pages.

(Continued)

*Primary Examiner* — Alexey Shmatov
*Assistant Examiner* — Kyu Hyung Han
(74) *Attorney, Agent, or Firm* — Anthony M. Pallone

(57) ABSTRACT

An example system includes a processor to receive a machine learning network and a selected homomorphic encryption (HE) packing framework. The processor can generate list of HE packings for the machine learning network based on the selected HE packing framework. The processor can extend the machine learning network to include additional neurons based on the list of HE packings. The processor can also train the extended machine learning network.

15 Claims, 9 Drawing Sheets

100

(56) References Cited

OTHER PUBLICATIONS

Cai et al., "Hunter: HE-Friendly Structured Pruning for Efficient Privacy-Preserving Deep Learning", Session 8A: Machine Learning #2, Asia CCS '22 May 30-Jun. 3, 2022, Nagasaki, Japan, pp. 931-945.
Lee et al., "Privacy-Preserving Machine Learning With Full Homomorphic Encryption for Deep Neural Network", IEEE Access, Mar. 14, 2022, vol. 10, 2022, 16 pages.
List of IBM Patents or Applications Treated as Related.
Lou et al., "SHE: A Fast and Accurate Deep Neural Network for Encrypted Data", 33rd Conference on Neural Information Processing Systems (NeurIPS 2019), Jun. 2019, 9 pages.
Lu et al., "FFConv: Fast Factorized Neural Network Inference on Encrypted Data", ARXIV, Feb. 6, 2021, 9 pages.
Takabi et al., "Privacy preserving Neural Network Inference on Encrypted Data with GPUs", ARXIV, Nov. 26, 2019, 5 pages.
Yang et al., "FPGA Accelerator for Homomorphic Encrypted Sparse Convolutional Neural Network Inference", 2022 IEEE 30th Annual International Symposium on Field-Programmable Custom Computing Machines (FCCM), Retrieved Jun. 17, 2022, 9 pages.
Dathathri et al., "CHET: Compiler and Runtime for Homomorphic Evaluation of Tensor Programs", arXiv:1810.00845 [cs.LG]; DOI: 10.48550/arXiv.1810.00845, Oct. 1, 2018, 12 pages.
Elsloo et al., "SEALion: a Framework for Neural Network Inference on Encrypted Data", arXiv:1904.12840 [cs.LG]; DOI: 10.48550/arXiv.1904.12840, Apr. 29, 2019, 10 pages.
Mell et al., "The NIST Definition of Cloud Computing", National Institute of Standards and Technology, U.S. Department of Commerce, Special Publication 800-145, Sep. 2011, 7 pages.
Podschwadt et al., "SoK: Privacy-preserving Deep Learning with Homomorphic Encryption", arXiv:2112.12855 [cs.CR]; DOI: 10.48550/arXiv.2112.12855, Jan. 1, 2022, 14 pages.
Aharoni et al., "HeLayers: A Tile Tensors Framework for Large Neural Networks on Encrypted Data", Jan. 1, 2023, 18 pages, https://arxiv.org/abs/2011.01805.

* cited by examiner

100

200

300

400

500

600

700

800

900

MACHINE LEARNING NETWORK EXTENSION BASED ON HOMOMORPHIC ENCRYPTION PACKINGS

BACKGROUND

The present techniques relate to training machine learning models. More specifically, the techniques relate to training homomorphic encryption (HE) friendly neural networks.

SUMMARY

According to an embodiment described herein, a system can include processor to receive a machine learning network and a selected homomorphic encryption (HE) processing framework. The processor can also further generate a list of HE packings for the machine learning network based on the selected HE processing framework. The processor can also extend the machine learning network to include additional neurons based on the list of HE packings. The processor can then train the extended machine learning network.

According to another embodiment described herein, a method can include receiving, via a processor, a machine learning network and a selected homomorphic encryption (HE) packing framework. The method can further include generating, via the processor, list of HE packings for the machine learning network based on the selected HE packing framework. The method can also further include extending, via the processor, the machine learning network to include additional neurons based on the list of HE packings. The method can also include training, via the processor, the extended machine learning network.

According to another embodiment described herein, a computer program product for training machine learning networks can include computer-readable storage medium having program code embodied therewith. The program code executable by a processor to cause the processor to receive a machine learning network and a selected homomorphic encryption (HE) packing framework. The program code can also cause the processor to generate a list of HE packings for the machine learning network based on the selected HE packing framework. The program code can also cause the processor to extend the machine learning network to include additional neurons based on the list of HE packings. The program code can also cause the processor to train the extended machine learning network.

DETAILED DESCRIPTION

Homomorphic encryption (HE) allows performing operations on encrypted data. Such a cryptosystem may be used, for example, in a client-server scenario where the client desires the server to perform a function f(x). A client device may provide x and f can be obtained from a different source. HE enables the server to homomorphically compute f(x) without learning about x. One practical application of HE is for encrypted inference on neural networks running on the cloud. However, training and running neural networks, such as deep neural networks (DNNs), over HE may require HE-friendly architectures that may have lower accuracy compared to non HE-friendly architectures. For example, HE-friendly architectures include architectures in which particular functions such as sine and cosine have been adapted using any suitable methods to HE-friendly functions such as addition, multiplication, or some combination of these functions. Specifically, when training a machine learning model in HE environments, as in the cases above, these requirements may force the model owner to only use polynomial functions during training and inference. Therefore, the NN architecture may include polynomial activations instead of ReLU activations and MAX-Pooling instead of AVG-Pooling. Such conversion and associated approximations may result in lower accuracy models. In addition, HE processing is intensive and generally slow. For example, fully homomorphic encrypted (FHE) operations may be from three to five orders of magnitude more expensive with respect to processing compared to their plaintext counterparts.

According to embodiments of the present disclosure, a system includes a processor to receive a machine learning network and a selected homomorphic encryption (HE) packing framework. The processor can generate list of HE packings for the machine learning network based on the selected HE packing framework. The processor can extend the machine learning network to include additional neurons based on the list of HE packings. The processor can also train the extended machine learning network. Thus, embodiments of the present disclosure enable improved accuracy of HE-friendly DNNs without degrading their latency over the original HE inference. Thus, the performance of HE-friendly architectures may be improved without further reducing their processing speed. In this manner, the performance of such HE-friendly architectures may be increased to the accuracy of similar models trained on non-HE friendly architectures, for example using plain text. Moreover, the techniques described herein describe a fully automated process.

Figure 1:
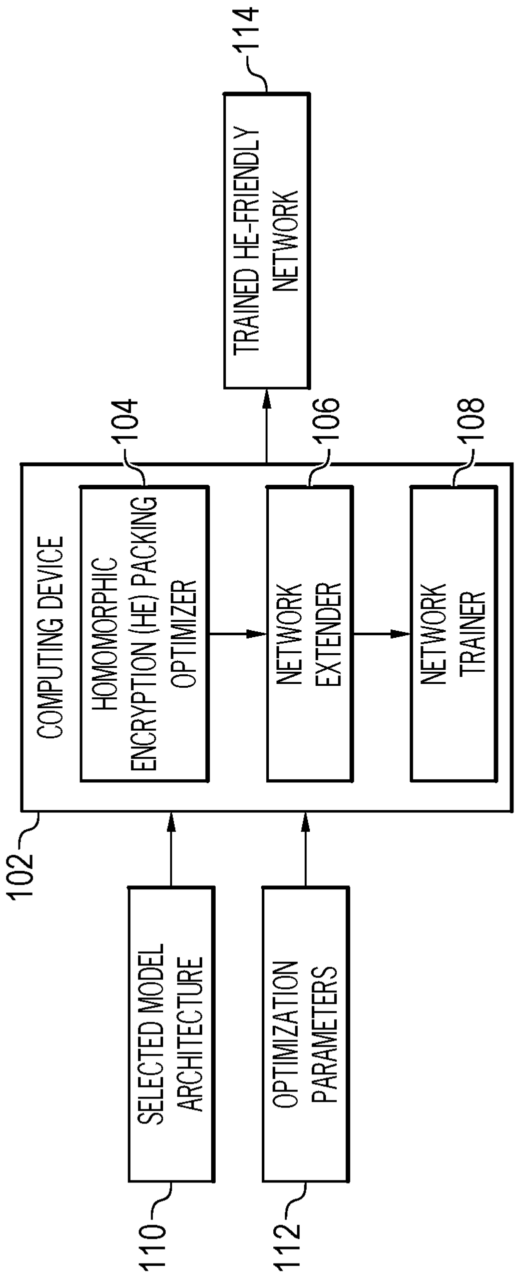
FIG. 1 is a block diagram of an example system for training machine learning networks using HE packing optimized network extension.

With reference now to FIG. 1, a block diagram shows an example system for training machine learning networks using HE packing optimized network extension. The example system is generally referred to by the reference number 100. FIG. 1 includes a computing device 102. The computing device 102 includes a homomorphic encryption (HE) packing optimizer 104. For example, the HE packing optimizer 104 may be the Tile Tensors optimizer, based on the Tile Tensors packing method, first released in November 2020. The computing device 102 also includes a network extender 106 communicatively coupled to the HE packing optimizer 104. The computing device 102 also further includes a network trainer 108 communicatively coupled to the network extender 106. The computing device 102 is receiving a selected model architecture 110 and optimization parameters 112. For example, the selected model architecture 110 may be any suitable neural network architecture, such as a deep neural network (DNN) with an HE-friendly architecture. As one example, the architecture may be the LeNet described in FIG. 2 below. In various examples, other architectures such as AlexNet, VGG-16, or any other architecture may be used. The computing device 102 is generating a trained extended HE-friendly network 114. For example, one or more of the layers of the trained extended HE-friendly network 114 may have been extended by the network extender 106 based on the HE packings generated by the HE packing optimizer 104.

In various examples, the HE packing optimizer 104 optimizes lists of HE packings based on the received selected model architecture 110 and optimization parameters 112. For example, each HE packing may be a ciphertext representing an encrypted group of underlying integers. As one example, the Tile Tensor packing method may be used to generate HE packings. In particular, the Tile Tensor packing method works with multi-dimensional arrays in a system that imposes tiles, which may be fixed-size vectors. In various examples, HE operations may be performed using a single instruction multiple data (SIMD) paradigm. For example, in SIMD, a message may be split into an array of values called slots. A single HE operation may then be applied to all these slots at once. However, packing a neural network in HE ciphertexts using a method such as SIMD packing may leave some of the ciphertexts slots empty. Occupying these slots with extra neuron weights may not affect the latency of the training or inference procedures. For example, given a model layer with 120 neurons, and a packing of 128 slots, the model layer may be extended to have 128 neurons with 8 extra dummy neurons having weights of zero. The addition of extra or dummy neurons to a NN may thus not harm the model accuracy because the weights and biases can be all set as zeros. Since the packing may also have had 128 original slots, the size of the packing and thus the latency of training or inference procedures may not be affected.

As one example, the selected model architecture 110 may have been programmed using the Pytorch deep learning framework, version 0.1.12 first released 2017, with a Keras neural network API, first released in March 2015, to specify a DNN architecture. In some examples, the selected model architecture 110 may have been programed using any other suitable libraries for programming neural networks, such as the TensorFlow machine learning system, first released November 2016. The computing device 102 may receive the selected model architecture 110 from a Pytorch/Keras API and send the selected architecture 110 to an HE packing optimizer 104. In some examples, the HE packing optimizer 104 may include a software development kit (SDK) that supports or automates the packing process, such as HELayers, version 1 released in November 2020. Alternatively, any suitable packing framework may be used, such as CHET, first released in October 2018. For example, the HELayers packing framework uses a special packing technique called tile tensors. A tile sensor is a data structure that packs tensors in fixed size chunks, as may be required for FHE, and allows these chunks to be manipulated similar to tensors. Tensors, as used herein, refer to multi-dimensional arrays. The HE packing optimizer 104 may output a set of HE packings. In various examples, every one of the elements in each of the HE packings may uniquely define how to pack plaintext data into possibly more than one array before encrypting the one or more arrays into ciphertexts. For example, in the case of HELayers, the HE packings may be more specifically tile tensor shapes. In various examples, a set of HE packings may be output for each layer of the DNN model. The network extender 106 of the computing device 102 may then identify incomplete tiles in the set of tile tensor shapes and extend the Pytorch/Keras DNN model accordingly. For example, each of the layers in the Pytorch/Keras DNN model may be extended based on the number of incomplete tiles in the set of tile tensor shapes. The Pytorch/Keras DNN model may then be retrained with the extended layers. Finally, the retrained model may be run in the HELayers SDK. For example, the retrained model may be repacked according to the chosen packing and encrypted and provided to a customer for use at inference. In various examples, the repacked model may be uploaded to an untrusted environment. For example, the untrusted environment can be a cloud, a different location, or just another untrusted process in a shared processing unit. An encrypted inference evaluation may then be executed using the encrypted model.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, or additional inputs, outputs, etc.).

Figure 2:
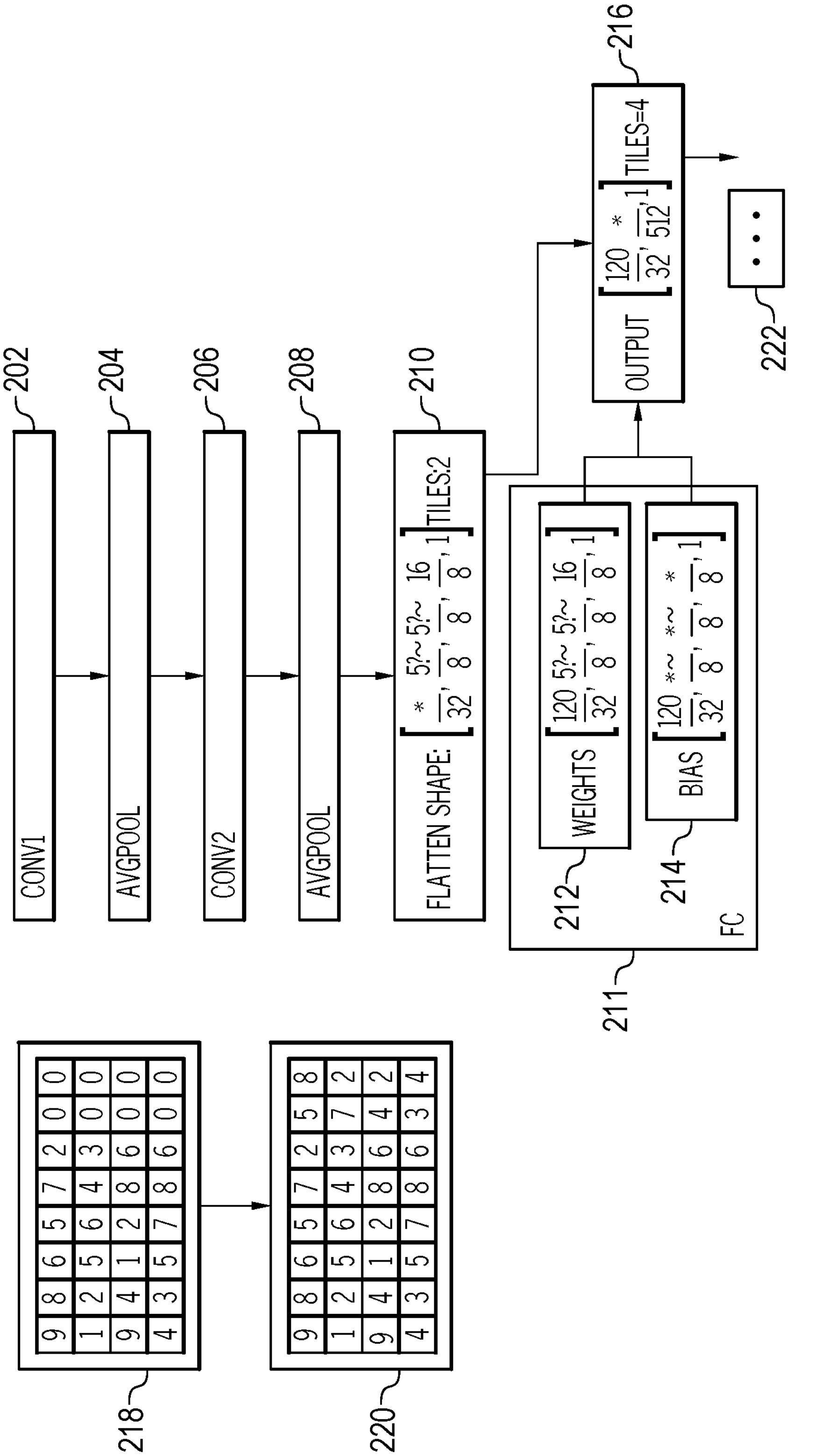
FIG. 2 is a block diagram of an example extension of the LeNet network, according to embodiments described herein.

FIG. 2 is a block diagram of an example extension of the LeNet network, according to embodiments described herein. The example LeNet network 200 may be extended and trained using the system 100 of FIG. 1, or the computing device 600 or processor 902 of FIGS. 6 and 9. In various examples, other architectures such as AlexNet, VGG-16, or any other architecture may be similarly extended.

The example LeNet network 200 is a convolutional neural network (CNN) that includes a first convolutional layer 202, a first average pooling layer 204, a second convolutional layer 206, and a second average pooling layer 208. The LeNet network 200 includes a flattening layer 210, a fully connected (FC) layer 211 including weights 212 and bias 214, and output layer 216. In addition, an initial tile-tensor based HE packing 218 with 32 slots including eight slots with values of zero is shown being converted into a full tile-tensor based HE packing 220 with the eight zeros of the initial tile-tensor based HE packing 218 converted into usable values. The layer size of the neural network may thus be adapted to 128 based on the HE architecture of multiples of 32. Additional layers 222 of the LeNet network left out for simplicity are represented using a block including an ellipsis. For example, the additional layers 222 may include fully connected layers, output layers, and activation layers, such as ReLU or polynomial activation layers.

At the flattening layer 210, a flatten shape operation is executed on the layers 202-208 to generate an array of elements. In particular, the array shown in flattening layer 210 is one embodiment of a notation that describes how elements are packed in a ciphertext. The array includes five elements representing the dimensions of the tile tensor that packs the data in the flatten layer 210. The denominator of each element represents the number of slots available for a particular dimension in each tile. The numerators represent the occupied slots for this dimension accommodated over several tiles (ciphertexts). The notation also includes symbols such as "*" indicating broadcasting elements over a given dimension, and "?" that indicates that a given dimension includes unknown or less important values that may be safely ignored.

The fully connected layer 211 includes a set of weights 212 and bias 214. In various examples, the set of weights 212 to be applied to the neural network may be modified. In particular, the array of weights 212 similarly includes five elements representing the dimensions of the neural network, with the denominators of the elements representing the slots available in each of the tile elements in that dimension, and the number of elements is represented in the numerators. In the example of FIG. 2, the original numerator of the fifth layer was 120, indicating a total of 120 slots occupied over several tiles. In various examples, because 120 is not a multiple of 32, eight of the slots in a final packing may be wasted during processing of the HE packings. Thus, the numerator 120 may be extended to 128 total occupied slots using the techniques described herein to result in a full HE packing 220 for all of the HE packings of the ciphertexts. Moreover, the number of tiles or ciphertexts may stay at 8, thus the performance of an HE processing may not be affected at all.

In various examples, the bias array 214 may also be similarly modified. For example, the number of total occupied slots may be similarly updated from 120 to 128.

It is to be understood that the block diagram of FIG. 2 is not intended to indicate that the LeNet network 200 is to include all of the components shown in FIG. 2. Rather, the LeNet network 200 can include fewer or additional components not illustrated in FIG. 2 (e.g., additional layers, or additional slots, etc.).

Figure 3:
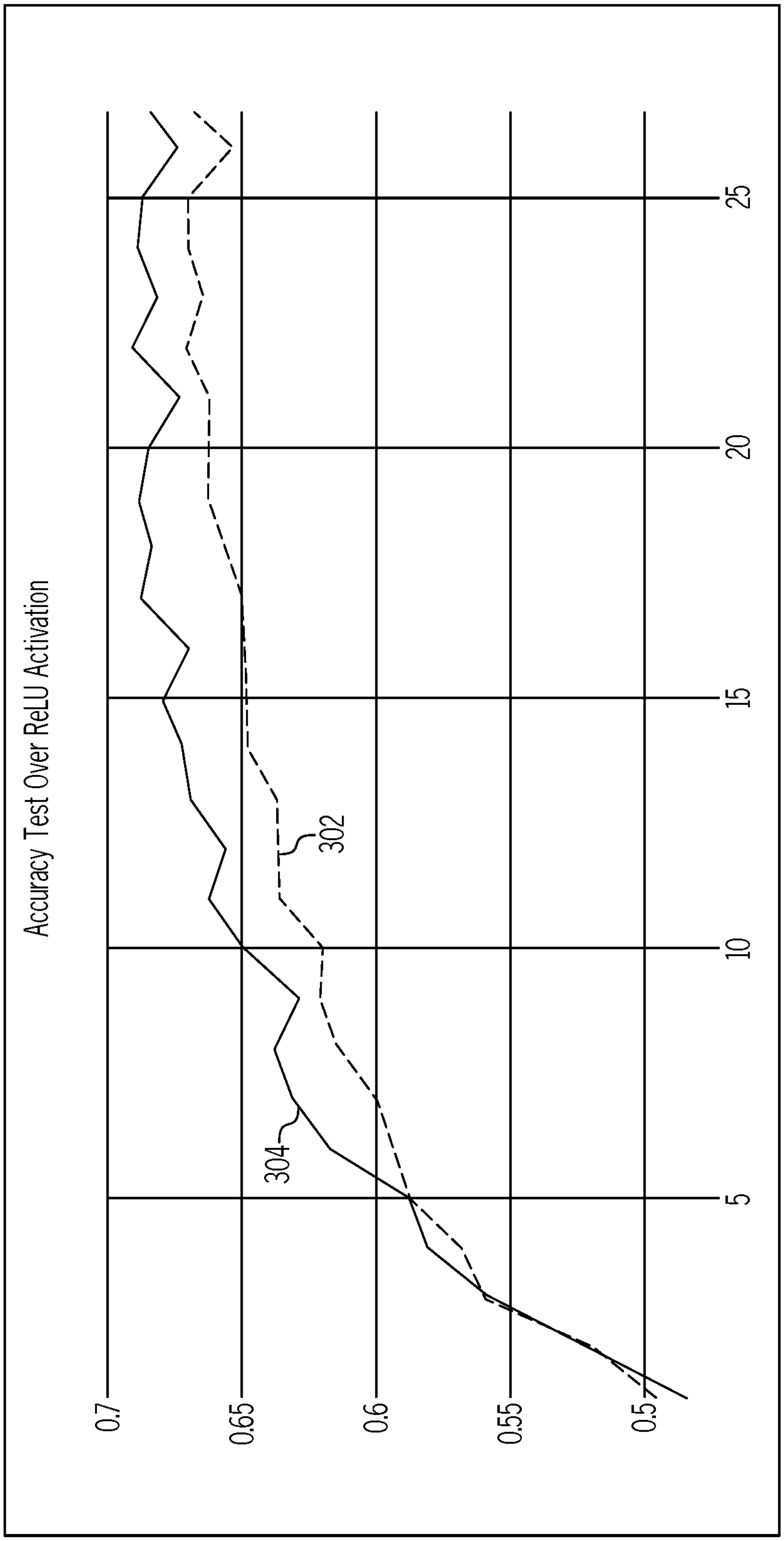
FIG. 3 is a graph illustrating improved accuracy over test data of a neural network implemented with a ReLU activation and trained according to embodiments described herein.

FIG. 3 is a graph illustrating improved accuracy over test data of a neural network implemented with a rectified linear unit (ReLU) activation and trained according to embodiments described herein. The graph 300 includes a first line 302 indicating an original test accuracy performance of a LeNet convolutional neural network (CNN) model over iterations of training. The graph 300 includes a second line 304 indicating model performance after application of the techniques described herein. As shown in FIG. 3, expanded model performance increases significantly with the after three iterations and maintains improved performance thereafter.

Figure 4:
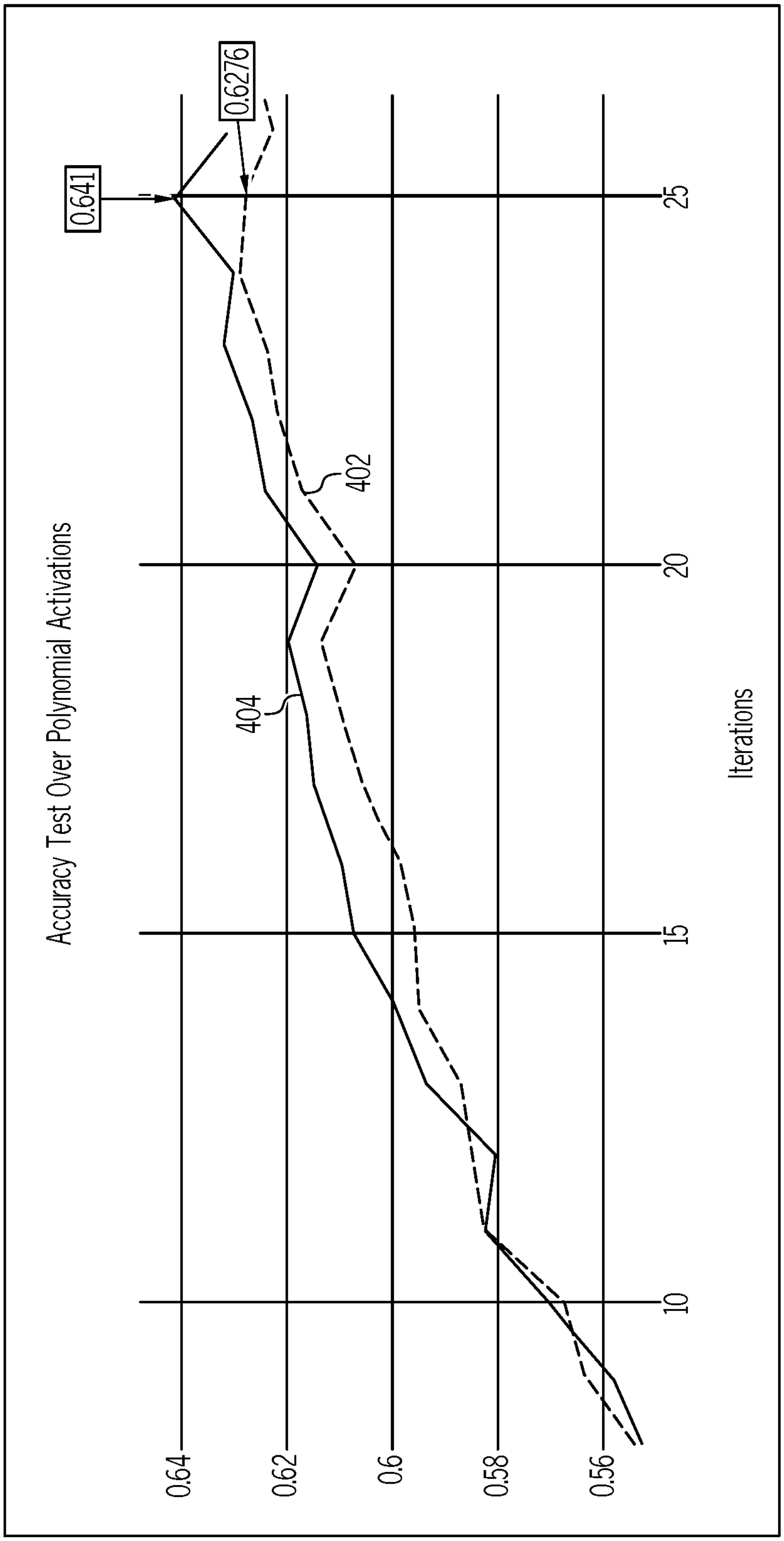
FIG. 4 is a graph illustrating improved accuracy over test data of a neural network implemented with polynomial activations and trained according to embodiments described herein.

FIG. 4 is a graph illustrating improved accuracy over test data of a neural network implemented with polynomial activations and trained according to embodiments described herein. The graph 400 includes a first line 402 indicating an original test accuracy performance of the LeNet model over iterations of training. The graph 400 includes a second line 404 indicating performance of an expanded LeNet model after application of the techniques described herein. As shown in FIG. 4, expanded model performance shows improvement before 10 iterations and after 13 iterations maintains improved performance.

Figure 5:
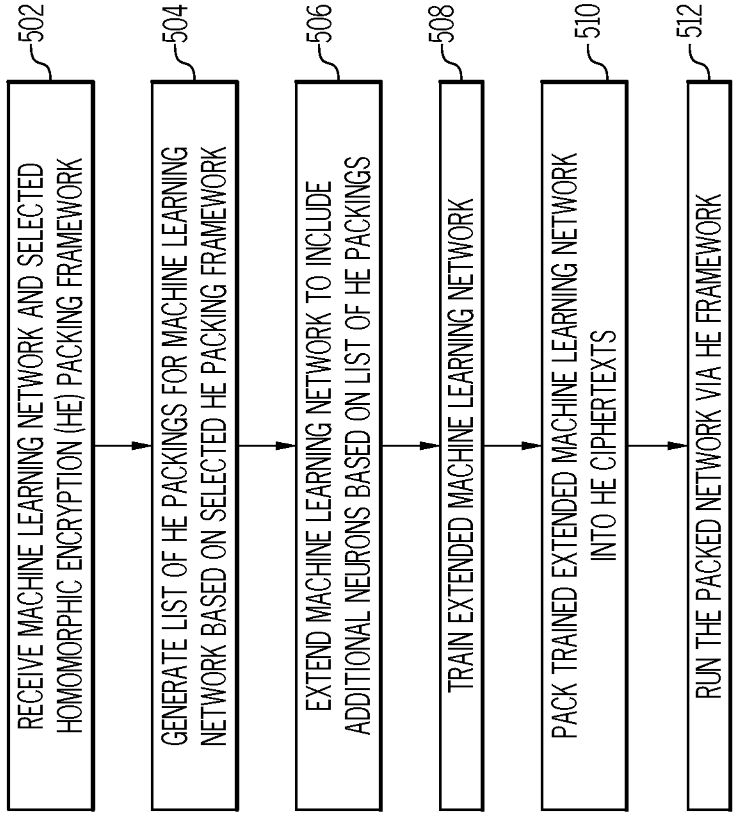
FIG. 5 is a process flow diagram of an example method that can train machine learning networks using HE packing optimized network extension.

FIG. 5 is a process flow diagram of an example method that can train machine learning networks using HE packing optimized network extension. The method 500 can be implemented with any suitable computing device, such as the computing device 300 of FIG. 3 and is described with reference to the systems 100 of FIG. 1. For example, the methods described below can be implemented by the processor 602 or the processor 902 of FIGS. 6 and 9.

At block 502, a processor receives a machine learning network and a selected homomorphic encryption (HE) packing framework. For example, the machine learning network may be an HE-friendly model architecture. In various examples, the machine learning network may or may not have been trained by a model owner with or without use of HE in the training process. In some examples, the processor may also receive any number of optimization parameters.

At block 504, the processor generates a list of HE packings for the machine learning network based on the selected HE packing framework. For example, the processor may feed the machine learning network into an HE processing program and receive a list of different HE packings. For example, the list of different HE packings may be received in any suitable format. In various examples, a list of different HE packings may be generated for each of any number of optimization parameters received. For example, the process may generate a number of lists of HE packings corresponding to a number of received optimization parameters. In some examples, a list of HE packings may be generated for each of the layers in the machine learning network.

At block 506, the processor extends the machine learning network to include additional neurons based on the list of HE packings. For example, the processor can analyze each of the lists of HE packings and detect model layers that can be extended with additional neurons. For example, the HE packing for a particular model layer may have empty slots available for the given packing size. In various example, the processor can add neurons to any number of layers of the machine learning network.

At block 508, the processor trains the extended machine learning network. For example, the extended machine learning network may be retrained in order to improve the accuracy of the extended machine learning network. In various examples, the extended machine learning network may be trained using HE encrypted training data or unencrypted plaintext training data.

At block 510, the processor packs the trained extended machine learning network into HE ciphertexts. For example, the processor may pack the extended machine learning network using the HE packing generated at block 504 that corresponds to the received optimization parameter.

At block 512, the processor runs the packed machine learning network via an HE framework. For example, the packed machine learning network may be used to process received data at inference. In various examples, the received data may be HE data.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
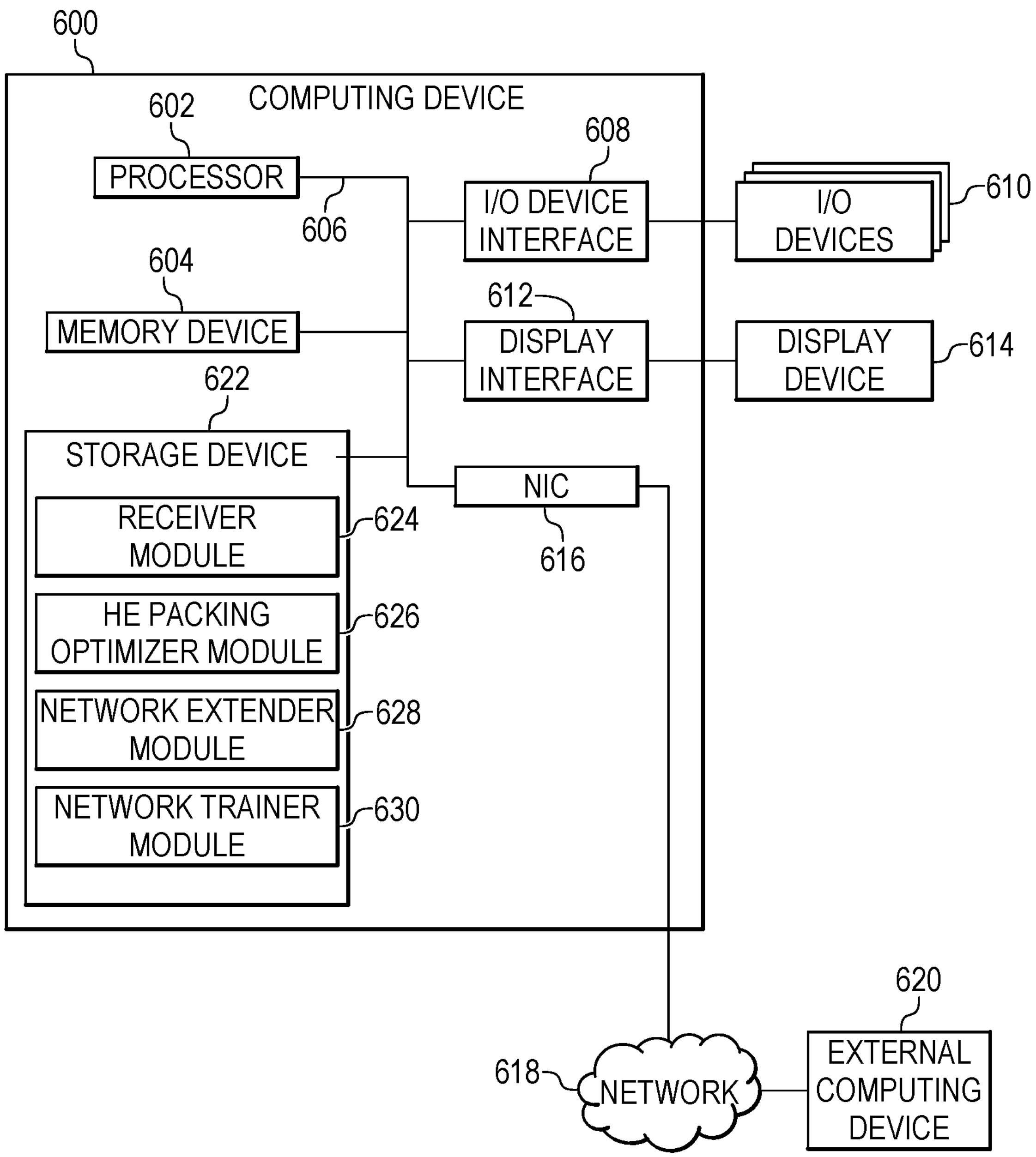
FIG. 6 is a block diagram of an example computing device that can train machine learning networks using HE packing optimized network extension.

FIG. 6 is block diagram of an example computing device that can train machine learning networks using HE packing optimized network extension. The computing device 600 may be for example, a server, desktop computer, laptop computer, tablet computer, or smartphone. In some examples, computing device 600 may be a cloud computing node. Computing device 600 may be described in the general context of computer system executable instructions, such as program modules, being executed by a computer system. Generally, program modules may include routines, programs, objects, components, logic, data structures, and so on that perform particular tasks or implement particular abstract data types. Computing device 600 may be practiced in distributed cloud computing environments where tasks are performed by remote processing devices that are linked through a communications network. In a distributed cloud computing environment, program modules may be located in both local and remote computer system storage media including memory storage devices.

The computing device 600 may include a processor 602 that is to execute stored instructions, a memory device 604 to provide temporary memory space for operations of said instructions during operation. The processor can be a single-core processor, multi-core processor, computing cluster, or any number of other configurations. The memory 604 can include random access memory (RAM), read only memory, flash memory, or any other suitable memory systems.

The processor 602 may be connected through a system interconnect 606 (e.g., PCI®, PCI-Express®, etc.) to an input/output (I/O) device interface 608 adapted to connect the computing device 600 to one or more I/O devices 610. The I/O devices 610 may include, for example, a keyboard and a pointing device, wherein the pointing device may include a touchpad or a touchscreen, among others. The I/O devices 610 may be built-in components of the computing device 600, or may be devices that are externally connected to the computing device 600.

The processor 602 may also be linked through the system interconnect 606 to a display interface 612 adapted to connect the computing device 600 to a display device 614. The display device 614 may include a display screen that is a built-in component of the computing device 600. The display device 614 may also include a computer monitor, television, or projector, among others, that is externally connected to the computing device 600. In addition, a network interface controller (NIC) 616 may be adapted to connect the computing device 600 through the system interconnect 606 to the network 618. In some embodiments, the NIC 616 can transmit data using any suitable interface or protocol, such as the internet small computer system interface, among others. The network 618 may be a cellular network, a radio network, a wide area network (WAN), a local area network (LAN), or the Internet, among others. An external computing device 620 may connect to the computing device 600 through the network 618. In some examples, external computing device 620 may be an external webserver 620. In some examples, external computing device 620 may be a cloud computing node.

The processor 602 may also be linked through the system interconnect 606 to a storage device 622 that can include a hard drive, an optical drive, a USB flash drive, an array of drives, or any combinations thereof. In some examples, the storage device may include a receiver module 624, a homomorphically encryption (HE) packing optimizer module 626, a network extender module 628, and a network trainer module 630. The receiver module 624 can receive a machine learning network and a selected homomorphic encryption (HE) processing framework. For example, the received machine learning network may be pretrained. For example, the machine learning network may have been pretrained using HE training data. In some example, the received machine learning network may be an HE-friendly deep neural network (DNN). In various examples, the receiver module 624 can also receive an optimization parameter. The HE packing optimizer module 626 can generate a list of HE packings for the machine learning network based on the selected HE processing framework. For example, the HE packing optimizer module 626 can generate the list of HE packings based on the optimization parameter. In various examples, the list of HE packings may be in one of various different formats. In some examples, the HE packing optimizer module 626 can generate a number of lists of HE packings corresponding to a number of received optimization parameters. The network extender module 628 can extend the machine learning network to include additional neurons based on the list of HE packings. In some examples, the network extender module 628 can extend the machine learning network by adding neurons to a layer of the machine learning network. For example, the added neurons may be initially set to have weights of zero. The module 624 may then. The network trainer module 630 can train the extended machine learning network. The module 628 can. In various examples, the HE packing optimizer module 626 can then pack the trained extended machine learning network into HE ciphertexts. In some examples, the packed machine learning network may then be run via the HE processing framework.

It is to be understood that the block diagram of FIG. 6 is not intended to indicate that the computing device 600 is to include all of the components shown in FIG. 6. Rather, the computing device 600 can include fewer or additional components not illustrated in FIG. 6 (e.g., additional memory components, embedded controllers, modules, additional network interfaces, etc.). Furthermore, any of the functionalities of the receiver module 624, the HE packing optimizer module 626, the network extender module 628, and the network trainer module 630 may be partially, or entirely, implemented in hardware and/or in the processor 602. For example, the functionality may be implemented with an application specific integrated circuit, logic implemented in an embedded controller, or in logic implemented in the processor 602, among others. In some embodiments, the functionalities of the receiver module 624, the HE packing optimizer module 626, the network extender module 628, and the network trainer module 630 can be implemented with logic, wherein the logic, as referred to herein, can include any suitable hardware (e.g., a processor, among others), software (e.g., an application, among others), firmware, or any suitable combination of hardware, software, and firmware.

Figure 7:
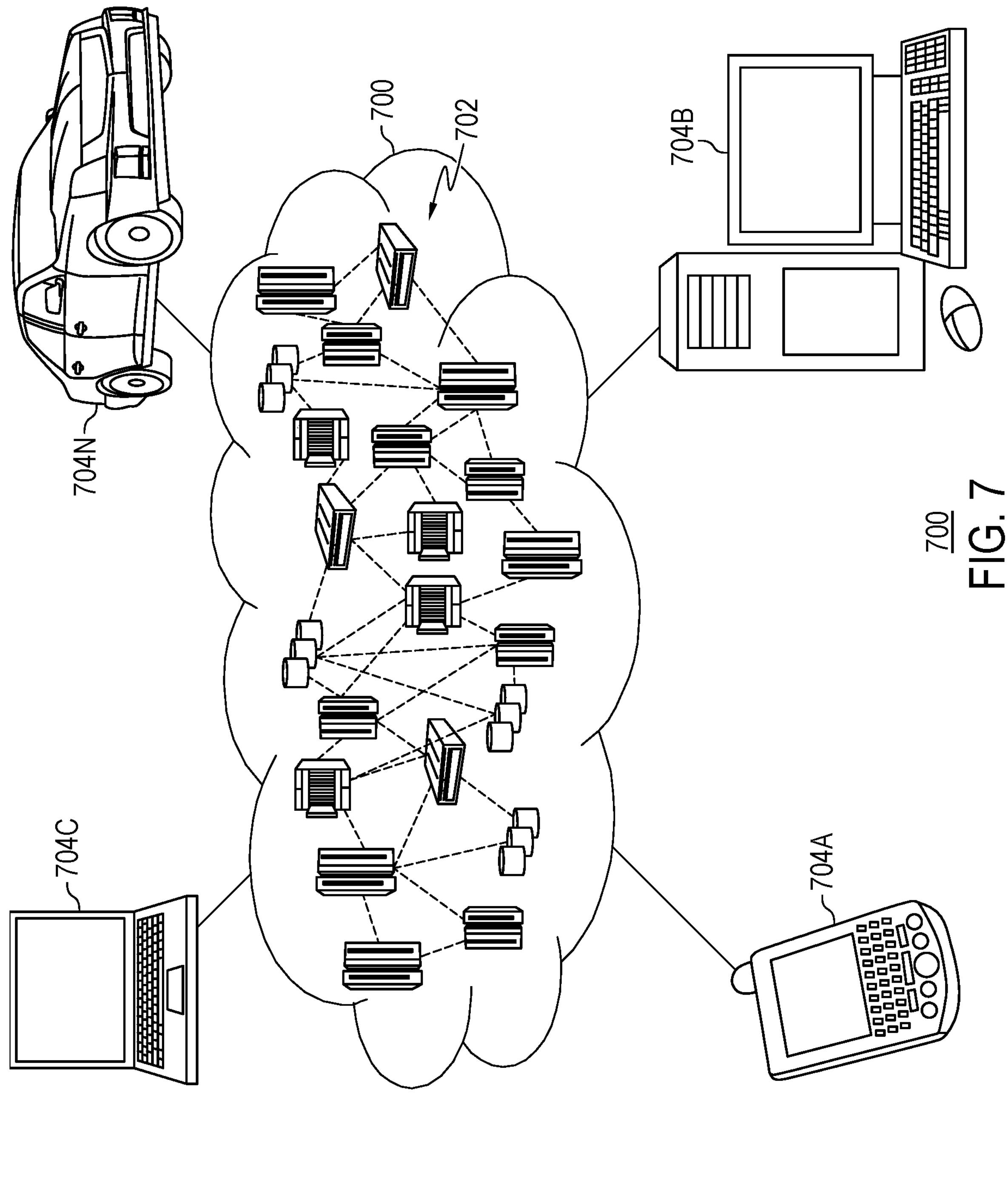
FIG. 7 is a diagram of an example cloud computing environment according to embodiments described herein.

Referring now to FIG. 7, illustrative cloud computing environment 700 is depicted. As shown, cloud computing environment 700 includes one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
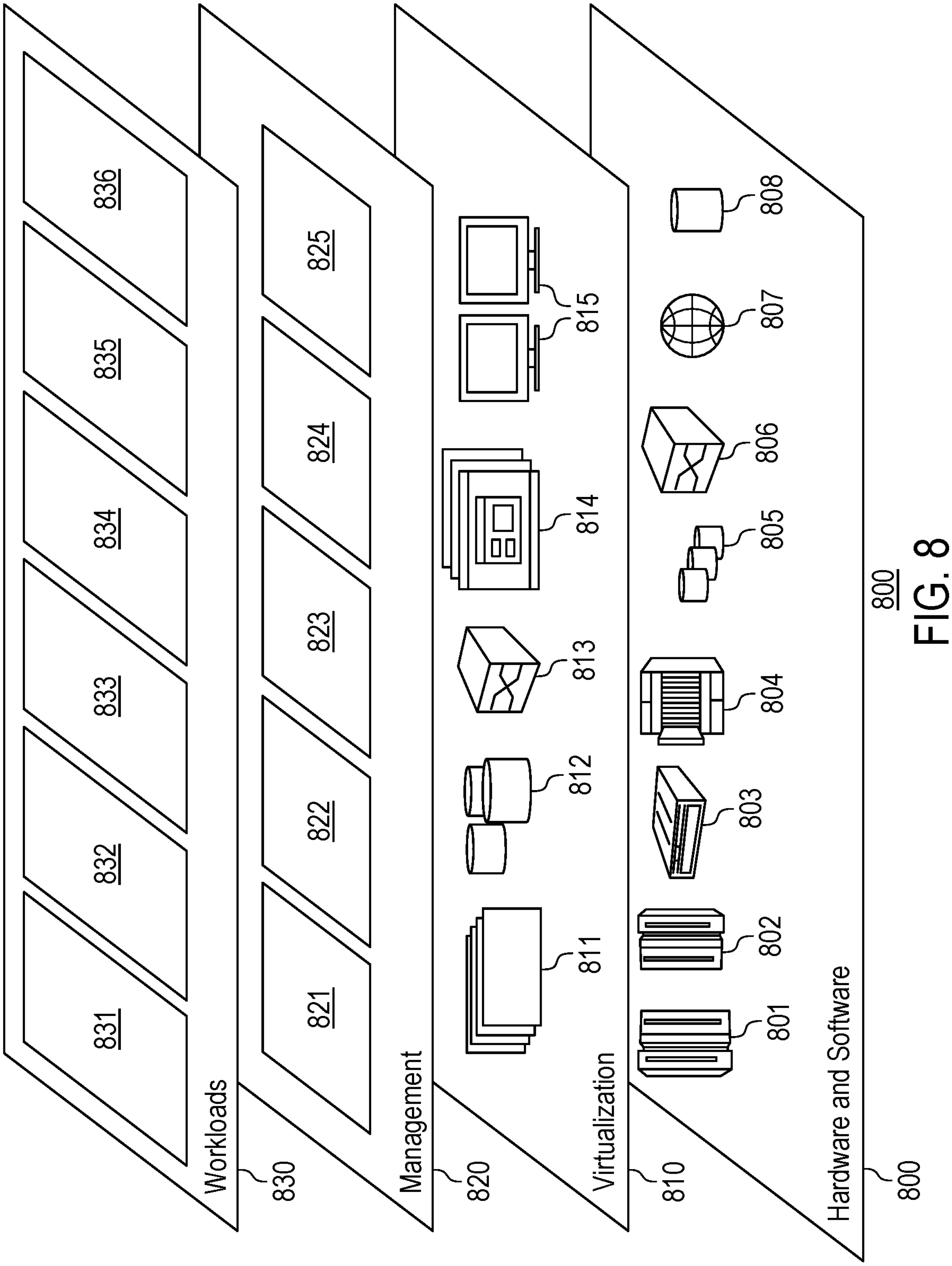
FIG. 8 is a diagram of an example abstraction model layers according to embodiments described herein.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 800 includes hardware and software components. Examples of hardware components include: mainframes 801; RISC (Reduced Instruction Set Computer) architecture based servers 802; servers 803; blade servers 804; storage devices 805; and networks and networking components 806. In some embodiments, software components include network application server software 807 and database software 808.

Virtualization layer 810 provides an abstraction layer from which the following examples of virtual entities may be provided: virtual servers 811; virtual storage 812; virtual networks 813, including virtual private networks; virtual applications and operating systems 814; and virtual clients 815.

In one example, management layer 820 may provide the functions described below. Resource provisioning 821 provides dynamic procurement of computing resources and other resources that are utilized to perform tasks within the cloud computing environment. Metering and Pricing 822 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 823 provides access to the cloud computing environment for consumers and system administrators. Service level management 824 provides cloud computing resource allocation and management such that required service levels are met. Service Level Agreement (SLA) planning and fulfillment 825 provide pre-arrangement for, and procurement of, cloud computing resources for which a future requirement is anticipated in accordance with an SLA.

Workloads layer 830 provides examples of functionality for which the cloud computing environment may be utilized. Examples of workloads and functions which may be provided from this layer include: mapping and navigation 831; software development and lifecycle management 832; virtual classroom education delivery 833; data analytics processing 834; transaction processing 835; and HE-friendly machine learning model training 836.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
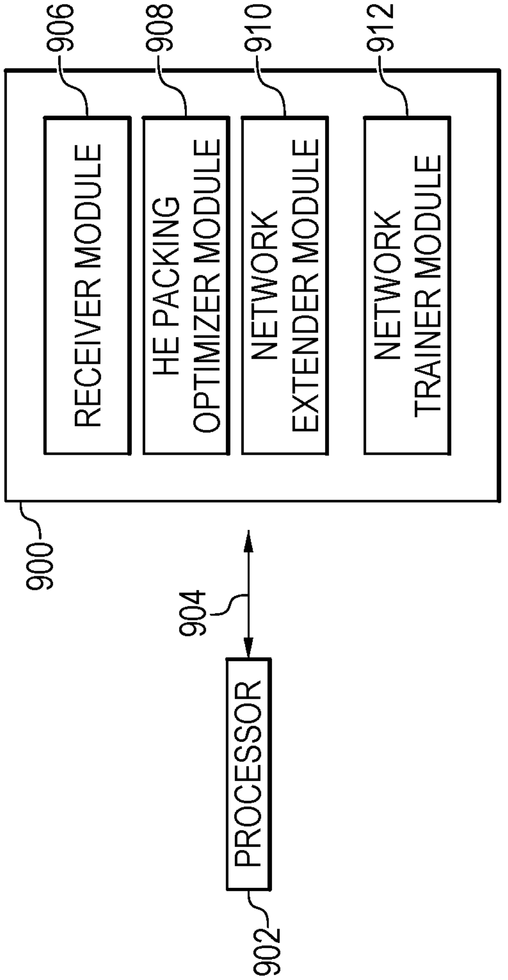
FIG. 9 is an example tangible, non-transitory computer-readable medium that can train machine learning networks using HE packing optimized network extension.

Referring now to FIG. 9, a block diagram is depicted of an example tangible, non-transitory computer-readable medium 900 that can train machine learning networks using HE packing optimized network extension. The tangible, non-transitory, computer-readable medium 900 may be accessed by a processor 902 over a computer interconnect 904. Furthermore, the tangible, non-transitory, computer-readable medium 900 may include code to direct the processor 902 to perform the operations of the method 500 of FIG. 5.

The various software components discussed herein may be stored on the tangible, non-transitory, computer-readable medium 900, as indicated in FIG. 9. For example, a receiver module 906 includes code to receive a machine learning network and a selected homomorphic encryption (HE) packing framework. The receiver module 906 also includes code to receive any number of optimization parameters. For example, the optimization parameters may be parameters related to performance or memory. A homomorphic encryption (HE) packing optimizer module 908 includes code to generate a list of HE packings for the machine learning network based on the selected HE packing framework. The HE packing optimizer module 908 further includes code to generate the list of HE packings based on the optimization parameter. The HE packing optimizer module 908 also includes code to generate a number of lists of HE packings corresponding to a number of received optimization parameters. In various examples, the HE packing optimizer module 908 further includes code to generate a list of HE packings for each layer in the machine learning network. A network extender module 910 includes code to extend the machine learning network to include additional neurons based on the list of HE packings. For example, the network extender module 910 may include code to add neurons to a layer of the machine learning network A network trainer module 912 includes code to train the extended machine learning network. In some examples, the HE packing optimizer module 908 further includes code to pack the trained extended machine learning network into HE ciphertexts. For example, the HE packing optimizer module 908 can pack the extended machine learning network using an HE packing of the list of HE packings that corresponds to a received optimization parameter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 9 may be included within the tangible, non-transitory, computer-readable medium 900, depending on the specific application. For example, an execution module may include code to run the packed machine learning network via the HE processing framework.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

one or more processors, one or more computer readable memories, one or more computer readable storage medium, and program instructions stored on at least one of the one or more computer readable storage medium for execution by at least one of the one or more processors, via at least one of the one or more computer readable memories, to cause at least one of the one or more processors to:

receive a machine learning network and a selected homomorphic encryption (HE) packing framework;

generate a respective list of HE packings for each layer of the machine learning network based on the selected HE packing framework;

analyze, for each layer, the respective list of HE packings to identify one or more incomplete tile tensors indicative of empty slots;

extend one or more layers of the machine learning network based on the identified one or more incomplete tile tensors by adding a number of neurons equal to a number of indicated empty slots and by occupying each of the empty slots with a respective additional neuron weight, wherein added neurons are initialized with weights of zero prior to training; and train the extended machine learning network.

2. The system of claim 1, wherein the at least one of the one or more processors is further caused to:

pack the trained extended machine learning network into HE ciphertexts; and run the packed machine learning network via the HE packing framework.

3. The system of claim 1, wherein the at least one of the one or more processors is to receive an optimization parameter and generate a list of HE packings based on the optimization parameter.

4. The system of claim 1, wherein the at least one of the one or more processors is to generate a plurality of lists of HE packings corresponding to a plurality of received optimization parameters.

5. The system of claim 1, wherein the received machine learning network is pretrained.

6. The system of claim 1, wherein the received machine learning network comprises an HE-friendly deep neural network (DNN).

7. A computer-implemented method, comprising:

receiving, via a processor, a machine learning network and a selected homomorphic encryption (HE) packing framework;

generating, via the processor, a respective list of HE packings for each layer of the machine learning network based on the selected HE packing framework;

analyzing, via the processor, for each layer, the respective list of HE packings to identify one or more incomplete tile tensors indicative of empty slots;

extending, via the processor, one or more layers of the machine learning network based on the identified one or more incomplete tile tensors by adding a number of neurons equal to a number of indicated empty slots and by occupying each of the empty slots with a respective additional neuron weight, wherein added neurons are initialized with weights of zero prior to training; and training, via the processor, the extended machine learning network.

8. The computer-implemented method of claim 7, further comprising:

packing, via the processor, the trained extended machine learning network into HE ciphertexts; and running, via the processor, the packed machine learning network via an HE framework.

9. The computer-implemented method of claim 7, further comprising:

receiving, via the processor, an optimization parameter; and generating, via the processor, a list of HE packings based on the optimization parameter.

10. The computer-implemented method of claim 7, wherein generating respective lists of HE packings comprises generating a plurality of lists of HE packings corresponding to a plurality of received optimization parameters.

11. The computer-implemented method of claim 7, further comprising packing the extended machine learning network using an HE packing of the list of HE packings that corresponds to a received optimization parameter.

12. A computer program product for training machine learning networks, the computer program product comprising a computer-readable storage medium having program code embodied thereon, the program code executable by a processor to cause the processor to:

receive a machine learning network and a selected homomorphic encryption (HE) packing framework;

generate a respective list of HE packings for each layer of the machine learning network based on the selected HE packing framework;

analyze, for each layer, the respective list of HE packings to identify one or more incomplete tile tensors indicative of empty slots;

extend one or more layers of the machine learning network based on the identified one or more incomplete tile tensors by adding a number of neurons equal to a number of indicated empty slots and by occupying each of the empty slots with a respective additional neuron weight, wherein added neurons are initialized with weights of zero prior to training; and train the extended machine learning network.

13. The computer program product of claim 12, further comprising program code executable by the processor to:

pack the trained extended machine learning network into HE ciphertexts; and run the packed machine learning network via the HE packing framework.

14. The computer program product of claim 12, further comprising program code executable by the processor to:

receive an optimization parameter; and generate a list of HE packings based on the optimization parameter.

15. The computer program product of claim 12, further comprising program code executable by the processor to generate a plurality of lists of HE packings corresponding to a plurality of received optimization parameters.

* * * * *